United States Patent [19]

Nakacho et al.

[11] Patent Number: 5,114,809
[45] Date of Patent: May 19, 1992

[54] ALL SOLID-STATE LITHIUM SECONDARY BATTERY

[75] Inventors: Yoshifumi Nakacho; Akiyoshi Inubushi; Yuji Tada, all of Tokushima, Japan

[73] Assignee: Otsuka Kagaku Kabushiki Kaisha, Osaka, Japan

[21] Appl. No.: 598,648
[22] PCT Filed: Feb. 21, 1990
[86] PCT No.: PCT/JP90/00210
§ 371 Date: Oct. 19, 1990
§ 102(e) Date: Oct. 19, 1990
[87] PCT Pub. No.: WO90/10317
PCT Pub. Date: Jul. 9, 1990

[30] Foreign Application Priority Data

Feb. 22, 1989 [JP] Japan .................... 1-44328

[51] Int. Cl.$^5$ ............................ H01M 10/40
[52] U.S. Cl. .................... 429/192; 429/218
[58] Field of Search .......... 429/192, 218; 252/62.2

[56] References Cited

U.S. PATENT DOCUMENTS 4,840,856 6/1989 Nakacho et al. ............. 429/218 X

FOREIGN PATENT DOCUMENTS 61-091868 5/1986 Japan .
61-254626 11/1986 Japan .
62-274555 11/1987 Japan .
63-162724 7/1988 Japan .

Primary Examiner—Stephen Kalafut
Attorney, Agent, or Firm—Armstrong & Kubovcik

[57] ABSTRACT

The present invention provides an all solid-state lithium secondary battery comprising an oxide of layer structure serving as a positive electrode active substance and represented by the formula $$(V_2O_5)x\bullet(A)y\bullet zH_2O$$

wherein $x+y=1$, $y=0.03$ to $0.5$, $z=0.1$ to $1.6$, A is at least one oxide seleced from among $GeO_2$, $SiO_2$, $B_2O_3$, $MoO_3$, $WO_3$, $Nb_2O_5$, $TeO_2$, $Bi_2O_3$, $Cr_3O_8$ and $ZrO_2$, lithium or a lithium alloy serving as a negative electrode active substance, and a compound serving as an electrolyte and represented by the formula $$\{[N=P(E)_2]\bullet(LiX)a\}b$$

wherein
i) $[N=P(E)_2]$ is an oligoethyleneoxypolyphosphazene having a sulfone group and comprising a desired arrangement of segments represented by the following formulae (I), (II) and (III), or a mixture of such polyphosphazenes:

$$-[N=P]l- \begin{matrix} O(CH_2CH_2O)hCH_2CH_2CH_2SO_3M \\ | \\ | \\ O(CH_2CH_2O)hCH_2CH_2CH_2SO_3M \end{matrix} \quad (I)$$

$$-[N=P]m- \begin{matrix} O(CH_2CH_2O)kR \\ | \\ | \\ O(CH_2CH_2O)kR' \end{matrix} \quad (II)$$

$$-[N=P]n- \begin{matrix} O(CH_2CH_2O)hCH_2CH_2CH_2SO_3M \\ | \\ | \\ O(CH_2CH_2O)kR \end{matrix} \quad (III)$$

ii) X is an anion,
iii) M is a metal from Groups I and II in Periodic table of the chemical elements,
iv) R and R' are each methyl, ethyl or propyl,
v) h and k are each the average number of repeating ethyleneoxy units and are in the range of $0 \leq h \leq 15$ and $0 \leq k \leq 22.5$, respectively,
vi) a is the ratio of (LiX) to $[N=P(E)_2]$ and is a real number of about 0.001 to about 4,
vii) l, m and n are each 0 or a posotive integer in the range of $3 \leq b = l+m+n \leq 200000$, and $l+n \neq 0$.

The all solid-state lithium secondary battery of the invention is useful as a secondary battery having a high energy density and normally operable at usual ambient temperatures.

2 Claims, 4 Drawing Sheets

ALL SOLID-STATE LITHIUM SECONDARY BATTERY

TECHNICAL FIELD

The present invention relates to all solid-state secondary batteries, and more particularly to all solid-state lithium secondary batteries comprising an oxide of layer structure serving as a positive electrode active substance and a polyphosphazene mixture as an electrolyte.

BACKGROUND ART

Secondary batteries presently in wide use include lead batteries and nickel-cadmium batteries wherein the single-cell voltage is about 2 V, and an aqueous solution is used. In recent years, efforts are made to investigate and develop secondary batteries of high energy density which give a high single-cell voltage of at least 3 V and include a negative electrode of lithium. However, when lithium is used which reacts with water or the like, aprotic electrolytes must be used since aqueous electrolytes are not usable. Although polar organic solvents are presently in wide use, a majority of these solvents have a low boiling point (high vapor pressure) are inflammable and therefore involve the likelihood of staining neighboring members and ignition or firing due to a leak or break and the hazard of explosion due to erroneous use of overcharging. Furthermore, repeated discharge and charge of the secondary battery as contemplated form dendrite on the negative electrode, entailing the problem of reduced discharge-charge efficiency and short-circuiting between the positive and negative electrodes. Accordingly, many reports are made on the development of techniques for improving the discharge-charge efficiency of the negative electrode and the cycle life by inhibiting dendrite. Proposed in these reports are, for example, use of a methylated cyclic ether solvent as the solvent for battery electrolytes (K. H. Abraham et al. in "Lithium Batteries," J. P. Gabano, editor, Academic Press, London (1983)), a method of forming an ionically conductive protective film at the Li interface by adding polyethylene glycol, polypropylene glycol, polyethylene oxide or like additive to an electrolyte system (Journal of Power Sources, Vol 12, No. 2, pp. 83-144 (1984) and Unexamined Japanese Patent Publication SHO 60-41773), a method of inhibiting Li dendrite by alloying an electrode per se with Al (Unexamined Japanese Patenmt Publication SHO 59-108281).

On the other hand, M. Armand and N. Duclot disclose a novel secondary battery of high energy density incorporating a thin-film polymer electrolyte in Laid-Open French Patent Publication No. 2442512 and European Patent No. 13199. Yao et al. (J. Inorg. Nucl. Chem., 1967, 29, 2453) and Farrington et al. (Science, 1979, 204, 1371) generally describe inorganic ionically conductive solids. These solids, which are powdery, must be pelletized by a high-pressure press for fabrication into batteries. This offers a great obstacle against productivity, uniformity, etc. The pelletized solid is hard and brittle, is therefore difficult to make into a thin film of increased area, and requires a great pressure when to be adhered to the active electrode substance, so that the procedure has problems in work efficiency and adhesion. Furthermore, the solid encounters difficulty in following and compensating for variations in the volume of electrode materials during the operation of the battery and has the hazard of breaking the electrolyte. Sequlir et al. (Extended Abstracts, 163rd Meeting Electrochemical Society, 1983, 83, 751, Abstract, No. 493) describe a battery of novel design including a solvent-free thin-film polymer electrolyte, stating that the electrolyte is usable at a medium temperature of about 100° C. as determined by testing. However, the conductivity at room temperature is as low as $10^{-6} \sim 10^{-7}$ S/cm and is insufficient.

P. M. Blonsky et al. (J. Am. Chem. Soc., 106, 6854, 1984) state that polyphosphazene (MEEP) is useful as an electrolyte for electrochemical batteries. However, they merely disclose data as to a.c. conductivity in the range of from 30° C. to 97° C. and have not effected discharge and charge with d.c.

Further Blonsky states in the thesis for his doctorate (University Microfilms International Dissertation Information Service, 8610511, Northwestern University, PH. D. 1986), page 71 that the lithium of $MEEP/CF_3SO_3Li$ and $LiBF_4$ compounds has a transportation value of about 0.4 to about 0.2.

To ensure the movement of ions under d.c. conditions, the selective movement of the contemplated ion is of great importance because although the number of contemplated ions remains almost unchanged since they are constantly supplied by the electrode material, counter ions, which are not supplied from the counter electrode, are very small in number in the vicinity of the counter electrode, consequently resulting in very low electric conductivity. This tendency becomes more pronounced under a higher electric field with the lapse of time. However, with solid electrolytes wherein the solubility and diffusion mobility of salts are smaller than liquids, the transportation value of contemplated ions should ideally be 1 and is preferably approximate to 1 to the greatest possible extent. Thus, organic high polymer solid electrolytes have the advantages of being easily workable and flexible, are expected to compensate for the drawback of inorganic solid electrolytes and therefore appear very promising, whereas they have different problems to overcome for actual use. Additionally, whether the battery fabricated operates as desired as such can not be judged solely from the properties of the individual components thereof, but the battery must be tested for the judgment. For example, the problems to be encountered are the interface impedance between the components, current efficiency, resistance to redox, stability with time, etc.

An object of the present invention is to eventually provide an all solid-state lithium secondary battery with use of a compound which functions normally as a second battery electrolyte of high energy density at usual ambient temperatures from the viewpoints of:

(1) soiling and hazard due to leakage of liquid and breakage,
(2) reduced efficiency and short-circuit due to the formation of dendrite, and
(3) conductivity and transportation value at room temperature.

DISCLOSURE OF THE INVENTION

The present invention provides an all solid-state lithium secondary battery comprising an oxide of layer structure serving as a positive electrode active substance and represented by the formula $$(V_2O_5)x \bullet (A)y \bullet zH_2O$$

wherein x+y=1, y=0.03 to 0.5, z=0.1 to 1.6, A is at least one oxide selected from among $GeO_2$, $SiO_2$, $B_2O_3$, $MoO_3$, $WO_3$, $Nb_2O_5$, $TeO_2$, $Bi_2O_3$, $Cr_3O_8$ and $ZrO_2$, lithium or a lithium alloy serving as a negative electrode active substance, and a compound serving as an electrolyte and represented by the formula $$\{[N=P(E)_2]\bullet(LiX)a\}b.$$

i) $[N=P(E)_2]$ is an oligoethyleneoxypolyphosphazene having a sulfone group and comprising a desired arrangement of segments represented by the following formulae (I), (II) and (III), or a mixture of such polyphosphazenes.

ii) X is an anion.
iii) M is a metal from Groups I and II in Periodic table of the chemical elements.
iv) R and R' are each methyl, ethyl or propyl.
v) h and k are each the average number of repeating ethyleneoxy units and are in the range of $0 \leq h \leq 15$ and $0 \leq k \leq 22.5$, respectively.
vi) a is the ratio of (LiX) to $[N=P(E)_2]$ and is a real number of about 0.001 to about 4.
vii) l, m and n are each 0 or a positive integer in the range of $3 \leq b = l+m+n \leq 200000$, and $l+n \neq 0$.

According to the present invention, the formation of dendrite is considered attributable to the convection of the medium, liquid leakage to the flow of liquid, and ignition to the inflammability and high vapor pressure of organic solvents. The above problems (1) and (2) can be overcome if the electrolyte is unflowable, flame retardant or nonflammable, and low in vapor pressure. We have found that these requirements can be fulfilled by solid and flame-retardant polyphosphazenes analogous to those disclosed in JP-A-41889/1983 and already in use as flame retardants.

Further for the electrolyte to exhibit high conductivity at room temperature, there must be a large number of conductive ions at room temperature, and these ions need to be readily mobile. The salt must therefore be great in solubility and high in the degree of dissociation and have a low glass transition temperature (Tg). For the electrolyte to retain high conductivity with good stability, the electrolyte needs to remain free of polarization despite the lapse of time and to be high in the transportation value of contemplated ions.

We have made various investigations directing attention to the fact that polyphosphazenes are as low as up to $-70°$ C. in Tg and that various active groups can be introduced into the side chain of these compounds. As a result, we have overcome the problem (3) based on the finding that the behavior of ions can be altered by incorporating a ferroelectric site into the side chain.

Although the effect of the alkylsulfone group, one of the active groups of the invention, still remains to be clarified in detail, the effect will presumably be attributable to the fact that the sulfone group, which is ferroelectric, interacts with ionic species added to function favorably for ion dissociation and mobility and the selectivity of mobile ions.

X in the above-mentioned compound of the invention is an anion which is preferably one selected from among $CF_3SO_3^-$, $NCS^-$, $I_3^-$, $NO_3^-$, $CF_3COO^-$, $ClO_4^-$, $BF_4^-$, $NO_2^-$, $SiF_5^-$, $FSO_3^-$, $AsF_6^-$, $PF_6^-$, $I^-$, $Br^-$, $Cl^-$, $TCNQ^-$(7,7,8,8-tetracyanoquinodimethane), $CCl_3COO^-$, $DDQ^{2-}$(2,3-dichloro-5,6-dicyano-p-benzoquinone), $C_6H_5SO_3^-$, $AlCl_4^-$ and $R-O-CH_2CH_2CFHCF_2SO_3^-$ [wherein R is $-(CH_2CH_2O)n-R'$, $$-(CH_2CHO)_n-R', \text{ or } -(CHCH_2O)_n-R'.$$
$$\quad\quad |\quad\quad\quad\quad\quad\quad\quad |$$
$$\quad\quad CH_3\quad\quad\quad\quad\quad\quad CH_3$$

R' is H, $CH_3$, $C_2H_5$ or $C_3H_7$, and n is the average number of repeating oligoethyleneoxy or oligopropyleneoxy chains and is a real number in the range of $0 \leq n \leq 10^5$.

$[N=P(E)_2]b$ of the present invention can be prepared according to JP-A-162724/1988. The electrolytic compound of the invention can be obtained by adding a salt represented by LiX, or causing the compound and the salt to dissolve in each other. The electrolytic compound is about $-80°$ C. to about $-30°$ C. in glass transition temperature. When determined by the method of Ogata et al. (Polymer Preprints, Japan, Vol. 35, No. 8, p.2626), the lithium cation transportation value of the compound was 0.55 to 0.65 when the salt was $LiClO_4$ or $LiBF_4$, 0.74 when the salt was $CF_3SO_3Li$, or 0.90 in the case of $CH_3OCH_2CH_2CF HCF_2SO_3Li$. The lithium cation transportation value in excess of 0.5 indicates that the compound is of the lithium cation conduction type, hence a very good result.

Electrochemical batteries according to the present invention comprise a positive electrode and a negative electrode in contact with an electrolyte interposed therebetween and electrically separating the two electrodes, the two electrodes being so arranged in combination that the overall oxidation-reduction reaction between the electrodes produces an electromotive force when used in the usual manner or that the state thereof changes when energy is applied to the battery. Electrochemical batteries include primary and secondary batteries, fuel cells, ion selection sensors, electrochemical display devices and electronic integrators.

The positive electrode active substance (cathode active material) to be used in the present invention is an oxide layer structure represented by the formula $$(V_2O_5)x\bullet(A)y\bullet zH_2O$$

wherein x+y=1, y=0.03~0.5, z is 0.1 to 1.6, and A is at least one oxide selected from among $GeO_2$, $SiO_2$, $B_2O_3$, $MoO_3$, $WO_3$, $Nb_2O_5$, $TeO_2$, $Bi_2O_3$, $Cr_3O_8$ and $ZrO_2$. The ratio of the oxide A to $V_2O_5$ is 0.03~0.5, preferably 0.05 to 0.25. When less than 0.03 in ratios, insufficient resistance to excessive discharging will result, whereas ratios exceeding 0.5 lead to a lower discharge capacity and are therefore undesirable. If z is less than 0.1, the oxide of layer structure becomes crystallized, whereas if it is over 1.6, an excess of water reacts with Li to impair the characteristics of the battery. Thus, z values outside the above range are not desirable. The term the "oxide in the form of a layer (or of layer structure)" as used herein referes to an oxide which is in the form of a layer parallel to a flat substrate and exhibits the X-ray diffraction shown in FIG. 1 when made into a film on the substrate by the method to be described below.

The oxide of layer structure can be prepared by a usual method. First, an aqueous oxide solution is prepared from $V_2O_5$ and the oxide to be added thereto, by mixing together these oxides in a predetermined ratio, melting the mixture, bringing the melt into contact with a cooled steel plate or copper roll for quenching, and dissolving the resulting mixture in water. The melt may be directly placed into water for quenching to thereby prepare the aqueous solution. Alternatively, depending on the type of oxide to be added, it is possible to similarly dissolve $V_2O_5$ only in water and thereafter dissolve the other oxide directly into the solution or add the oxide as dissolved in water to the solution. Further alternatively, the aqueous solution can be prepared by mixing together an alkoxide $VO(OR)_3$ of $V_2O_5$ and an alkoxide of the other oxide in a predetermined ratio and thereafter hydrolyzing the mixture. It is also possible to treat an aqueous solution of ammonium vanadate or the like with an ion exchange resin to remove the ammonium ions. The desired oxide of layer structure can be obtained by drying the aqueous oxide solution thus prepared. The aqueous solution can be dried by various methods according to the contemplated purpose, for example, by spray-drying to obtain a powder or by spin coating to form a thin film. A positive electrode can therefore be prepared with use of the oxide of layer structure by coating an electrically conductive substrate of nickel, stainless steel or the like directly with the aqueous solution and drying the coating to form a film, or by admixing an electrically conductive powder of acetylene black, Ketjenblack, graphite or the like with the oxide powder to give conductivity thereto, further admixing a finely divided binder as of polytetrafluoroethylene, polyethylene or polystyrene with the mixture as required, kneading the resulting mixture, and shaping the mixture into pellets or a sheet of a specified thickness as deposites on netting or the like of stainless steel, nickel or the like.

At this time, a suitable amount of phosphazene polymer for use in the invention may be admixed in place of or along with the binder, followed by shaping similarly. Alternatively, a suitable amount of such an phosphazene polymer is dissolved in the aqueous solution of oxide of layer structure, and the resulting solution is dried and formed into a film or is made into a dry powder so as to be mixed with the conductive powder. These methods are useful for promoting the conduction of lithium ions to give a battery of reduced internal resistance.

On the other hand, the negative electrode active substance to be used in the present invention is lithium or a lithium alloy. For use as a negative electrode, the substance is made into a sheet, and an electrically conductive net of nickel, stainless steel or the like is clad with the sheet.

The battery of the invention is fabricated, for example, by coating a specified stainless steel plate with an aqueous solution of the oxide of layer structure, drying the solution, applying to the coating a solution of the polymer electrolyte prepared in advance, removing the solvent from the resulting coating to form a film, placing over the film a lithium-coated stainless steel plate prepared separately in an inert gas atmosphere, and vacuum-sealing the assembly with use of a sealant. When required for the construction of the battery, a separator film formed with minute pores and impregnated with the electrolyte is also usable.

Figure 4:
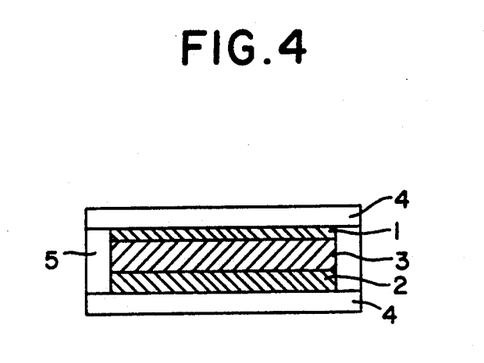
FIG. 4 is a schematic view in section showing a sheet-type thin-film battery embodying the invention.
Figure 5:
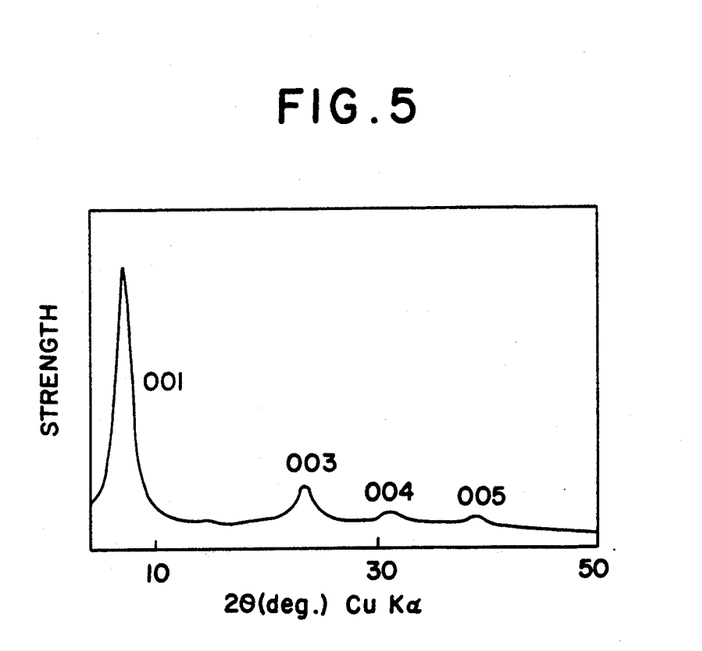
FIG. 5 shows an example of X-ray diffraction pattern of an oxide of layer structure prepared in the form of a film on a flat substrate for use in the present invention.

FIG. 4 shows an embodiment of all solid-state secondary battery prepared by using the above materials of the invention, which is an example of battery of the sheet type. The invention is applicable not only to batteries of this type but also to batteries of the button type or cylinder type.

BRIEF DESCRIPTION OF THE DRAWINGS

In FIG. 4, indicated at 1 is a film of oxide of layer structure, at 2 metallic lithium, at 3 polyphosphazene electrolyte, at 4 stainless steel foil, and at 5 a sealant.

BEST MODE OF CARRYING OUT THE INVENTION

The present invention will be described in greater detail with reference to the following examples.

EXAMPLE 1

A 375 mmoles quantity of oligoethylene glycol monomethyl ether of the formula $HO(CH_2CH_2O)kCH_3$ wherein k was about 7 on the average and 54 mmoles of oligoethylene glycol monoallyl ether of the formula $HO(CH_2CH_2O)hCH_2CH=CH_2$ wherein h was about 7 on the average were dissolved in about 500 ml of THF. A hexane solution of 390 mmoles of n-butyl lithium was added dropwise to the solution at $-20°$ to $-10°$ C. over a period of about 30 minutes. On the other hand, hexachlorotriphosphonitrile was placed into a polymerization tube, which was then connected to a vacuum line, followed by several repetitions of melting by heating, solidification by cooling and deaeration. With the deaerated tube thereafter sealed off, the phosphonitrile was polymerized at 250° C. for about 8 hours. The unreacted hexachlorotriphosphonitrile was removed by sublimation in a vacuum at about 70° C. for about 7 hours to obtain white rubberlike dichlorophosphonitrile polymer.

The dichlorophosphonitrile polymer (130 unit mmoles, 15.1 g) was dissolved in about 100 ml of dioxane. The solution was added dropwise to the lithium alcoholate previously prepared, at $-15°$ to $-10°$ C. for about 45 minutes, followed by refluxing for 5 hours. The reaction mixture was concentrated, water was added to the concentrate, the mixture was neutralized with dilute hydrochloric acid, and the mixture was thereafter dialyzed with a cellophane film. A 200 ml quantity of the resulting aqueous solution was sampled, and water was removed from the solution to obtain 9.67 g of a yellow rubberlike product.

The polymer was analyzed by various methods with the following results. $^{31}$P-NMR revealed absorption at −11.6 ppm (relative to phosphoric acid) due to polyphosphonitrile. IR spectroscopy revealed absorption at 3075 cm$^{-1}$ (C—H) and 1245-1320 cm$^{-1}$ (P=N) due to the substituent and main chain. The polymer was up to 0.015% in active chlorine concentration and 4.52% in P content. These results, the integration value obtained by $^1$H-NMR (FIG. 1) and the quantitative determination of allyl group by the iodination method indicated that the polymer had the following structure.

Figure 1:
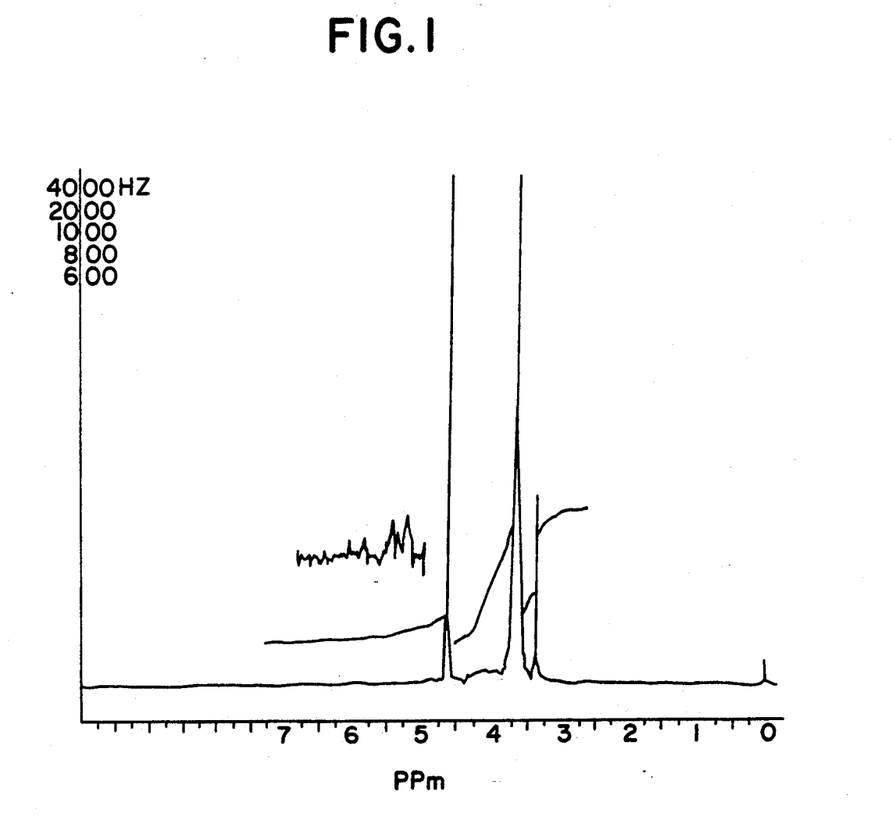
FIGS. 1~2 show NMR charts of polyphosphazene obtained in Example 1.

[N=P{O(CH$_2$CH$_2$O)$_{6.5}$CH$_3$}$_{1.62}${O(CH$_2$C-H$_2$O)$_{6.5}$CH$_2$CH=CH$_2$}$_{0.38}$]n

Further GPC analysis revealed a weight average molecular weight of 773000 and molecular weight distribution of 23.9.

Based on these analysis values, a solution of 0.2 mole of lithium sulfite in 100 ml of water was added to 1130 ml of the dialyzate (polymer content 54.6 g, allyl group 0.028 equivalent). Subsequently, a solution of 0.4 mole of lithium hydrogensulfite and 0.2 mole of lithium sulfite in 250 ml of water was added dropwise to the mixture at a temperature of about 25° C. for about 5 minutes, followed by reaction at 70° to 93° C. for 1 hour. The reaction mixture was dialyzed with a cellophane tube for 66 hours, and the dialyzate was concentrated to give 52.3 g (92%) of a slightly yellow viscous product which was found to have a glass transition temperature (Tg) of −70.2° C. by low-temperature DSC analysis.

The polymer was analyzed by various methods with the following results. $^1$H-NMR (FIG. 2) indicated that the peak at 5.0 to 5.5 ppm due to the allyl group had disappeared, further revealing peaks around 2.0 and 2.8 ppm due to the β methylene and α methylene of propylsulfonic acid. $^{31}$P-NMR revealed no change in the skeleton of polyphosphonitrile, thus indicating the progress of the desired reaction. Aqueous GPC analysis (FIG. 3) showed that the polymer was 612000 in weight average molecular weight and 13.4 in molecular weight distribution. Elementary analysis revealed 4.55% P, 1.71% S, 0.30% Li, 47.56% C, 8.28% H and 2.25% N. These results indicated that the polymer had the following structure.

Figure 2:
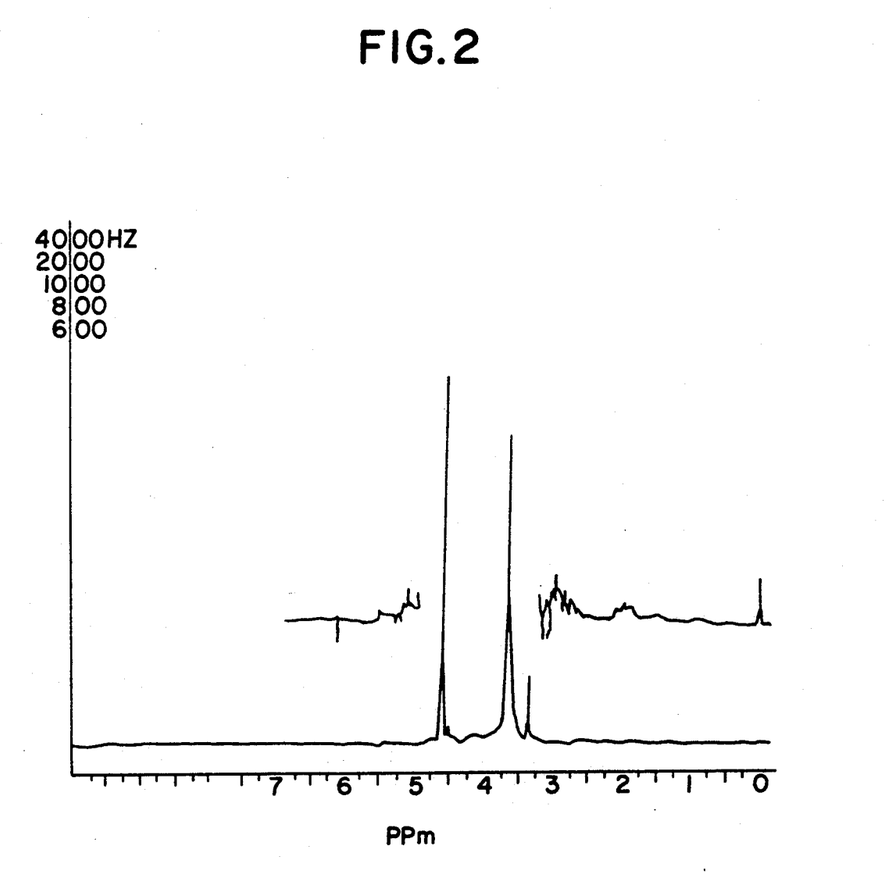
Figure 3:
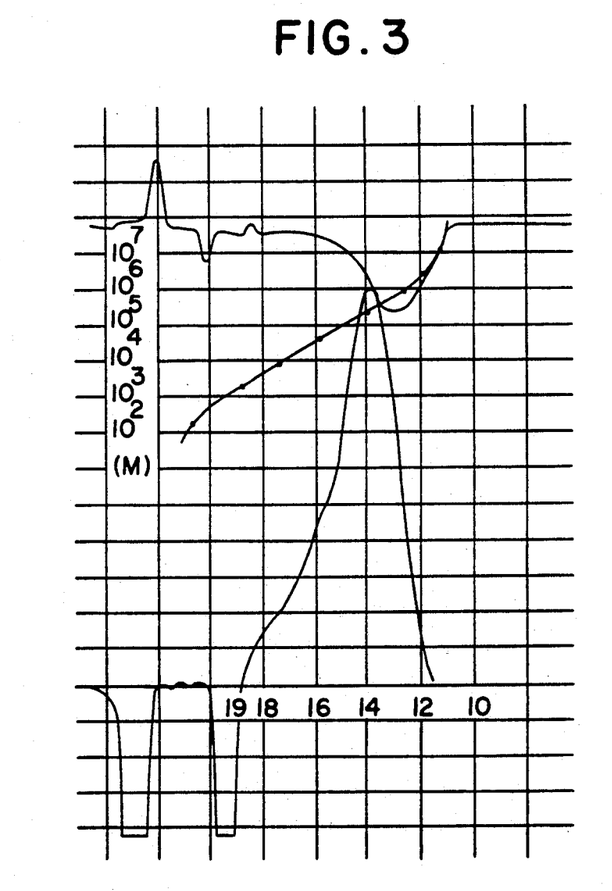
FIG. 3 shows GPC chart of the above polyphosphazene.

[N=P{O(CH$_2$CH$_2$O)$_{6.5}$CH$_3$}$_{1.62}${O(CH$_2$-H$_2$O)$_{6.5}$CH$_2$CH$_2$CH$_2$SO$_3$Li}$_{0.38}$]n

The calculated contents of component elements of the polymer were 4.31% P, 1.69% S, 0.37% Li, 47.78% C, 8.19% H and 1.94% N.

EXAMPLE 2

An allyl-containing phosphazene polymer, [N=P{O(CH$_2$CH$_2$O)$_{6.5}$CH$_3$}$_{1.62}${O(CH$_2$C-H$_2$O)$_{6.5}$CH$_2$CH=CH$_2$}$_{0.38}$]n was prepared in the same manner as in Example 1. An aqueous solution of the polymer (polymer content 21.45 g) was reacted with an aqueous solution of KHSO$_3$ (0.33 mole) and K$_2$SO$_3$ (0.11 mole) at 75° to 88° C. for 1 hour, followed by the same treatment as in Example 1 to obtain a polymer having the structure of

[N=P{O(CH$_2$CH$_2$O)$_{6.5}$CH$_3$}$_{1.63}${O(CH$_2$C-H$_2$O)$_{6.5}$CH$_2$CH$_2$CH$_2$SO$_3$K}$_{0.37}$]n

The polymer was 358000 in weight average molecular weight and 9.9 in molecular weight distribution and was found to contain 4.11% P, 1.78% S and 2.11% K.

EXAMPLES 3 TO 15

Each of the allyl-containing phosphazene polymers listed in Table 1 and prepared in the same manner as in Example 1 was reacted with the same sulfite and hydrogensulfite as used in Example 1 in similar proportions. The product was identified by $^1$H-NMR, $^{31}$P-NMR, elementary analysis, etc. with the results given in Table 2. Table 3 shows the structure of the polymer side chain determined from the results.

The values for CH$_2$CH=CH$_2$ and CH$_3$ in the product composition are the values of a and b in NP{O(CH$_2$C-H$_2$O)hCH$_2$CH=CH$_2$}a{O(CH$_2$CH$_2$O)kCH$_3$}b Further * represents NaH used in place of n-BuLi for the reaction.

TABLE 1

| Ex. | (NPCl$_2$)n n | unit mole | HO(CH$_2$CH$_2$O)hCH$_2$CH=CH$_2$ h | mole | HO(CH$_2$CH$_2$O)kCH$_3$ k | mole | n-BuLi mole |
|---|---|---|---|---|---|---|---|
| 3 | polymer | 0.025 | 7 | 0.0055 | 7 | 0.077 | 0.075 |
| 4 | polymer | 0.099 | 7 | 0.110 | 7 | 0.220 | 0.300 |
| 5 | polymer | 0.066 | 7 | 0.055 | 7 | 0.165 | 0.200 |
| 6 | polymer | 0.086 | 7 | 0.026 | 7 | 0.259 | 0.250 |
| 7 | polymer | 0.107 | 0 | 0.064 | 2 | 0.420 | 0.372 |
| 8 | polymer | 0.0267 | 0 | 0.010 | 7 | 0.090 | 0.086 |
| 9 | polymer | 0.109 | 1 | 0.065 | 2 | 0.430 | *0.354 |
| 10 | polymer | 0.162 | 1.5 | 0.084 | 2 | 0.630 | *0.56 |
| 11 | polymer | 0.175 | 5 | 0.116 | 3 | 0.462 | 0.525 |
| 12 | polymer | 0.114 | 0 | 0.180 | 0 | 3.000 | *0.320 |
| 13 | polymer | 0.073 | 10 | 0.240 | 0 | 0.054 | 0.274 |
| 14 | polymer | 0.063 | 0 | 0.050 | 22.5 | 0.152 | 0.180 |
| 15 | polymer | 0.042 | 10 | 0.047 | 22.5 | 0.093 | 0.127 |

| Ex. | product composition CH$_2$CH=CH$_2$/CH$_3$ | | yield (g) | active chlorine (%) | molecular weight Mw | molecular weight distribution Mw/Mn | Tg (°C.) |
|---|---|---|---|---|---|---|---|
| 3 | 0.05 | 1.95 | 14.8 | 0.026 | 247000 | 10.9 | |
| 4 | 0.82 | 1.18 | 68.4 | 0.030 | 323000 | 18.3 | |
| 5 | 0.53 | 1.47 | 42.8 | 0.060 | 256000 | 13.2 | −76.3 |
| 6 | 0.14 | 1.86 | 52.8 | 0.022 | 279000 | 16.1 | −73.7 |
| 7 | 0.28 | 1.72 | 20.0 | 0.023 | 4550 | 1.7 | |
| 8 | 0.31 | 1.69 | 11.8 | 0.030 | 524000 | 20.7 | |
| 9 | 0.45 | 1.55 | 26.0 | 0.028 | | | |
| 10 | 0.34 | 1.66 | 15.3 | 0.051 | | | |
| 11 | 0.37 | 1.63 | 20.6 | 0.044 | 50000 | 4.0 | |
| 12 | 0.32 | 1.68 | 4.3 | 0.011 | 43100 | 4.1 | |

TABLE 1-continued

| | | | | | | |
|---|---|---|---|---|---|---|
| 13 | 1.20 | 0.80 | 44.0 | 0.020 | 6000 | 2.3 |
| 14 | 0.14 | 1.86 | 40.6 | 0.035 | 108000 | 13.8 |
| 15 | 0.34 | 1.66 | 26.0 | 0.022 | 73000 | 5.9 |

TABLE 2

| Ex. | $NP\{O(CH_2CH_2O)hCH_2CH=CH_2\}a-\{O(CH_2CH_2O)kCH_3\}b$ amount used (g) | $Li_2SO_3$ mole | $LiHSO_3$ mole | rea. temp. (°C.) | rea. time (Hr) | final pH | average Mw | molecular weight distribution Mw/Mn | elementary analysis (%) P | S | Li |
|---|---|---|---|---|---|---|---|---|---|---|---|
| 3 | 13.3 | 0.045 | 0.090 | 71~84 | 1 | 7.7 | 112000 | 4.4 | 4.25 | 0.22 | 0.05 |
| 4 | 54.7 | 0.40 | 0.80 | 70~93 | 1.75 | 7.4 | 303000 | 13.7 | 3.80 | 3.21 | 0.70 |
| 5 | 28.8 | 0.02 | 0.04 | 84~93 | 1 | 7.4 | 133000 | 5.2 | 4.09 | 0.59 | 0.13 |
| 6 | 20.9 | 0.05 | 0.10 | 80~92 | 1 | 7.5 | 163500 | 5.6 | 3.87 | 2.12 | 0.46 |
| 7 | 9.1 | 0.025 | 0.10 | 65~85 | 2 | 8.3 | | | 10.67 | 3.08 | 0.67 |
| 8 | 10.6 | 0.05 | 0.10 | 77~83 | 1 | 7.8 | 133000 | 5.8 | 4.56 | 1.46 | 0.32 |
| 9 | 14.1 | 0.18 | 0.36 | 81~84 | 1 | 8.4 | 8300 | 4.6 | 9.84 | 4.57 | 1.00 |
| 10 | 7.0 | 0.025 | 0.05 | 65~82 | 1 | 8.6 | | | 9.85 | 3.46 | 0.76 |
| 11 | 9.4 | 0.025 | 0.05 | 65~100 | 1 | 7.6 | | | 6.95 | 2.65 | 0.58 |
| 12 | 2.4 | 0.023 | 0.047 | 80~97 | 1 | 7.0 | 54000 | 3.3 | 21.61 | 7.14 | 1.56 |
| 13 | 24.0 | 0.15 | 0.30 | 80~100 | 1 | 7.6 | 550000 | 14.1 | 3.55 | 4.91 | 1.07 |
| 14 | 29.0 | 0.0073 | 0.0146 | 80~94 | 1 | 5.4 | 32000 | 3.2 | 1.58 | 0.23 | 0.05 |
| 15 | 15.6 | 0.0097 | 0.0194 | 80~97 | 1 | 6.9 | 48000 | 2.5 | 1.60 | 0.56 | 0.12 |

TABLE 3

$[NP\{O(CH_2CH_2O)hCH_2CH_2CH_2SO_3Li\}a\{O(CH_2CH_2O)kCH_3\}b]n$

| Ex. | h | a | k | b |
|---|---|---|---|---|
| 3 | 7 | 0.05 | 7 | 1.95 |
| 4 | 7 | 0.82 | 7 | 1.18 |
| 5 | 7 | 0.14 | 7 | 1.86 |
| 6 | 7 | 0.53 | 7 | 1.47 |
| 7 | 0 | 0.28 | 2 | 1.72 |
| 8 | 0 | 0.31 | 7 | 1.69 |
| 9 | 1 | 0.45 | 2 | 1.55 |
| 10 | 1.5 | 0.34 | 2 | 1.66 |
| 11 | 5 | 0.37 | 3 | 1.63 |
| 12 | 0 | 0.32 | 0 | 1.68 |
| 13 | 10 | 1.34 | 0 | 0.66 |
| 14 | 0 | 0.14 | 22.5 | 1.86 |
| 15 | 10 | 0.34 | 22.5 | 1.66 |

EXAMPLE 16

A THF solution of one of various salts was added to a THF solution of the polymer obtained in Example 1 in such a proportion that the value a in $[N=P(Z)_2\bullet(MX)_2]$ was about 0.3. The THF was removed from the mixture in a vacuum to obtain a complex free from the solvent. The salts used were $LiClO_4$, $LiBF_4$, $CF_3SO_3Li$, $CH_3OCH_2CH_2CFHCF_2SO_3Li$, $CF_3COOLi$, $LiPF_6$, LiCl, $AgClO_4$, $Mg(ClO_4)_2$, $NaClO_4$, N-methyl pyridinium perchlorate and tetraethyl ammonium perchlorate. The complex was each rubberlike. The complex was found amorphous under an optical microscope and X-ray diffraction. The glass transition temperature was determined by differential scanning thermal analysis. The electric conductivity was measured in the range of 5 to 13000000 Hz by the a.c. complex impedance method. Table 4 shows the values of a.c. conductivity at 30° C. based on the measurements and lithium ion transportation values obtained by the method already described. When the value a representing the salt concentration was well above 4, a crystal phase was found with reduced conductivity, hence objection. If the value a is below 0.001, the presence of the salt produced no effect and was meaningless. Thus, the electrolyte of the invention is an excellent high polymer solid electrolyte which is high in electric conductivity and in the transportation value of the contemplated ion.

EXAMPLE 17

In the same manner as in Example 16, $LiClO_4$ was added in a proportion of about 0.3 in terms of the value a to the polymers of Examples 2 to 15. Table 5 shows the measurements of a.c. conductivity of the products.

TABLE 4

| salt | electric conductivity (S/cm) | cation transportation value |
|---|---|---|
| $LiClO_4$ | $4.5 \times 10^{-4}$ | 0.55 |
| $LiBF_4$ | $3.0 \times 10^{-4}$ | 0.65 |
| $LiPF_6$ | $3.5 \times 10^{-4}$ | 0.64 |
| LiCl | $8.5 \times 10^{-5}$ | |
| $CF_3SO_3Li$ | $1.8 \times 10^{-4}$ | 0.74 |
| $CH_3OCH_2CH_2CFHCF_2SO_3Li$ | $1.0 \times 10^{-4}$ | 0.90 |
| $CF_3COOLi$ | $7.5 \times 10^{-5}$ | |
| $NaClO_4$ | $4.0 \times 10^{-4}$ | |
| $AgClO_4$ | $5.5 \times 10^{-4}$ | |
| $Mg(ClO_4)_2$ | $9.0 \times 10^{-5}$ | |
| $Cu(ClO_4)_2$ | $7.3 \times 10^{-5}$ | |
|  $N-CH_3.ClO_4$ | $8.0 \times 10^{-5}$ | |
| $(C_2H_5)_4N.ClO_4$ | $7.0 \times 10^{-5}$ | |

TABLE 5

| Ex. | [NP{O(CH$_2$CH$_2$O)hCH$_2$CH$_2$CH$_2$SO$_3$Li}a—{O(CH$_2$CH$_2$O)kCH$_3$}b]n | | | | electric conductivity |
|---|---|---|---|---|---|
| | h | a | k | b | S/cm |
| 2 | 6.5 | 0.37 | 6.52 | 1.63 | 4.5 × 10$^{-4}$ |
| 3 | 7 | 0.05 | 7 | 1.95 | 5.5 × 10$^{-4}$ |
| 4 | 7 | 0.82 | 7 | 1.18 | 3.5 × 10$^{-4}$ |
| 5 | 7 | 0.14 | 7 | 1.86 | 5.0 × 10$^{-4}$ |
| 6 | 7 | 0.53 | 7 | 1.47 | 4.0 × 10$^{-4}$ |
| 7 | 0 | 0.28 | 2 | 1.72 | 3.0 × 10$^{-4}$ |
| 8 | 0 | 0.31 | 7 | 1.69 | 4.5 × 10$^{-4}$ |
| 9 | 1 | 0.45 | 2 | 1.55 | 3.0 × 10$^{-4}$ |
| 10 | 1.5 | 0.34 | 2 | 1.66 | 3.0 × 10$^{-4}$ |
| 11 | 5 | 0.37 | 3 | 1.63 | 3.0 × 10$^{-4}$ |
| 12 | 0 | 0.32 | 0 | 1.68 | 1.0 × 10$^{-4}$ |
| 13 | 10 | 1.34 | 0 | 0.66 | 1.0 × 10$^{-4}$ |
| 14 | 0 | 0.14 | 22.5 | 1.86 | 3.0 × 10$^{-4}$ |
| 15 | 10 | 0.34 | 22.5 | 1.66 | 3.0 × 10$^{-4}$ |

EXAMPLES 18 to 29

(1) Preparation of Positive Electrodes

One of various oxides was added in an amount of 10 mole % to V$_2$O$_5$, the compounds were fully pulverized and mixed together in a mortar, and the mixture was thereafter melted in a platinum nozzle with heating. The melt was forced out onto a copper rotor rotating at a high speed and quenched to obtain a ribbonlike amorphous product. When two oxides were used, each was added in an amount of 5 mole %. The amorphous product thus obtained was dissolved in water, and the solution was uniformly applied to stainless steel foil, measuring 5.5 cm × 9 cm and 20 μm in thickness, over the central portion thereof with an area of 36 cm$^2$ and then dried at about 80° C. to form a film. The coated foil was thereafter dried at 180° C. for 5 hours to obtain a positive electrode. The oxides similarly used, (V$_2$O$_5$)x-•(A)y•zH$_2$O, were all 0.3 in the z value.

(2) Preparation of Negative Electrodes

Pieces of stainless steel foil, measuring 5.5 cm × 9 cm and 20 μm in thickness, were each centrally clad with a piece of lithium foil weighing 20 mg for use as negative electrodes.

(3) Preparation of Electrolyte

A THF solution of LiClO$_4$ was admixed with a THF solution of the polymer of Example 1 so as to form [N=P(E)$_2$•(LiClO$_4$)$_{0.3}$] and to obtain an electrolyte.

(4) Fabrication of Battery

FIG. 4 is a schematic view in section showing a sheet-type battery embodying the invention. The battery externally measures 5.5 cm × 9 cm in conformity with the size of visiting cards and has thickness of about 0.2 mm. In the drawing, indicated at 1 is a film of oxide of layer structure, at 2 metallic lithium, at 3 a film prepared from a phosphazene polymer solution having LiClO$_4$ dissolved therein, at 4 stainless steel foil, and at 5 a sealant. For the fabrication of batteries, a film of electrolyte was formed by applying the phosphazene polymer solution to each positive electrode, removing THF and irradiating the coating with ultraviolet rays. Subsequently, the negative electrode with a sealant applied thereto over a width of about 5 mm along its periphery was affixed to the positive electrode, as vacuum-sealed to complete the battery.

For comparison, a battery of Comparative Example 1 was fabricated in the same manner as in Example 18 except that the positive electrode used was a sheet prepared from a mixture of finely divided crystalline V$_2$O$_5$, conductive agent of acetylene black and forming agent of polytetrafluoroethylene in the ratio of 70:25:5.

Further a battery of Comparative Example 2 was fabricated in the same manner as in Example except that the electrolyte was prepared by dissolving 1 mole/liter of LiClO$_4$ in a 1:1 mixture of propylene carbonate and dimethoxyethane, and impregnating a nonwoven fabric of polypropylene with the solution. V$_2$O$_5$ and GeO$_2$ were used in combination as oxides of layer structure for the positive electrode.

(5) Measurement of Charge-Discharge Characteristics of Batteries

Each of the batteries thus fabricated was subjected to charge-discharge cycles at a constant current of 0.5 mA between 4 V and 2 V, and the capacity retentivity of the battery was measured every cycle (with the initial discharge capacity taken as 100%). Table 6 shows the results.

TABLE 6

| No. | oxide added to V$_2$O$_5$ | capacity retentivity | | |
|---|---|---|---|---|
| | | 100 cycles | 200 cycles | 300 cycles |
| 18 | GeO$_2$ | 81 | 80 | 76 |
| 19 | SiO$_2$ | 78 | 79 | 75 |
| 20 | B$_2$O$_3$ | 73 | 73 | 68 |
| 21 | MoO$_3$ | 81 | 80 | 77 |
| 22 | WO$_3$ | 79 | 80 | 75 |
| 23 | Nb$_2$O$_5$ | 78 | 77 | 73 |
| 24 | TeO$_2$ | 75 | 75 | 70 |
| 25 | Bi$_2$O$_3$ | 77 | 77 | 73 |
| 26 | Cr$_3$O$_8$ | 78 | 77 | 72 |
| 27 | ZrO$_2$ | 79 | 79 | 75 |
| 28 | GeO$_2$ + MoO$_3$ | 81 | 79 | 76 |
| 29 | SiO$_2$ + WO$_3$ | 80 | 78 | 74 |
| Com. Ex. 1 | — | 66 | 51 | 16 |
| Com. Ex. 2 | GeO$_2$ | 75 | 76 | (*1) |

(*1) The test was discontinued after 241 cycles owing to short-circuiting due to dendrite.

EXAMPLES 30 to 35

Batteries were fabricated in the same manner as in Example 18 with the exception of varying the proportion of oxide of layer structure to be used for the positive electrode, and using the phosphazene polymer prepared in Example 2 and having an average molecular weight of about 360000, and lithium-aluminum alloy for the negative electrode. However, the oxide of layer structure was dried at 200° C. for 3 hours. The batteries were subjected to charge-discharge cycles (at a constant current of 0.5 mA) between 4 V and 2 V to measure the average amount of discharge during 300 cycles. Table 7 shows the results.

TABLE 7

| No. | oxide added to V$_2$O$_5$ | concn. of oxide to V$_2$O$_5$ (*2) | average amount of discharge (*3) |
|---|---|---|---|
| 30 | GeO$_2$ | 0.05 | 100 |
| 31 | GeO$_2$ | 0.3 | 90 |
| 32 | MoO$_3$ | 0.1 | 103 |
| 33 | MoO$_3$ | 0.4 | 95 |
| 34 | SiO$_2$ | 0.05 | 100 |
| 35 | SiO$_2$ | 0.2 | 93 |
| Com. Ex. 3 | — | 0 | 100 |
| Com. Ex. 4 | GeO$_2$ | 0.6 | 33 |
| Com. Ex. 5 | MoO$_3$ | 0.6 | 52 |

TABLE 7-continued

| No. | oxide added to $V_2O_5$ | concn. of oxide to $V_2O_5$ (*2) | average amount of discharge (*3) |
|---|---|---|---|
| Com. Ex. 6 | $SiO_2$ | 0.6 | 30 |

(*2) The y value for the formula $(V_2O_5)x \cdot (A)y \cdot zH_2O$ wherein $x + y = 1$, and z was 0.2 for all the oxides of layer structure.

(*3) Relative to the average amount of discharge achieved with use of $V_2O_5$ alone as the oxide of layer structure and taken as 100.

INDUSTRIAL APPLICATION

The all solid-state lithium secondary battery of the invention is useful as a secondary battery having a high energy density and normally operable at usual ambient temperatures.

We claim:

1. An all solid-state lithium secondary battery comprising an oxide of layer structure serving as a positive electrode active substance and represented by the formula

$$(V_2O_5)x \bullet (A)y \bullet zH_2O$$

wherein $x+y=1$, $y=0.03$ to $0.5$, $z=0.1$ to $1.6$, A is at least one oxide selected from among $GeO_2$, $SiO_2$, $B_2O_3$, $MoO_3$, $WO_3$, $Nb_2O_5$, $TeO_2$, $Bi_2O_3$, $Cr_3O_8$ and $ZrO_2$, lithium or a lithium alloy serving as a negative electrode active substance, and a compound serving as an electrolyte and represented by the formula $$\{[N=P(E)_2]\bullet(LiX)a\}b$$

wherein i) $[N=P(E)_2]$ is an oligoethyleneoxypolyphosphazene having a sulfone group and comprising a desired arrangement of segments represented by the following formulae (I), (II) and (III), or a mixture of such polyphosphazenes:

ii) X is an anion,
iii) M is a metal from Groups I and II in Periodic table of the chamical elements,
iv) R and R' are each methyl, ethyl or propyl,
v) h and k are each the average number of repeating ethyleneoxy units and are in the range of $0 \leq h \leq 15$ and $0 \leq k \leq 22.5$, respectively,
vi) a is the ratio of (LiX) to $[N=P(E)_2]$ and is a real number of about 0.001 to about 4,
vii) l, m and n are each 0 or a posotive integer in the range of $3 \leq b = 1+m+n \leq 200000$, and $1+n \neq 0$.

2. A lithium secondary battery as defined in claim 1 wherein X is an anion which is one selected from among $CF_3SO_3^-$, $NCS^-$, $I_3^-$, $NO_3^-$, $CF_3COO^-$, $ClO_4^-$, $BF_4^-$, $NO_2^-$, $SiF_5^-$, $FSO_3^-$, $AsF_6^-$, $PF_6^-$, $I^-$, $Br^-$, $Cl^-$, $TCNQ^-$, $CCl_3COO^-$, $DDQ^{2-}$, $C_6H_5SO_3^-$, $AlCl_4^-$ and $R-O-CH_2CH_2CFHCF_2SO_3^-$, [wherein R is $-(CH_2CH_2O)n-R'$, R' is H, $CH_3$, $C_2H_5$ or $C_3H_7$, and n is the average number of repeating oligoethyleneoxy or oligopropyleneoxy chains and is a real number in the range of $0 \leq n \leq 10^5$.

* * * * *